(12) United States Patent
Cimo et al.

(10) Patent No.: US 7,770,414 B2
(45) Date of Patent: Aug. 10, 2010

(54) PROCESS AND DEVICE FOR MANUFACTURING GLASS SHEET

(75) Inventors: Patrick J Cimo, Corning, NY (US); Michael T Murtagh, Painted Post, NY (US); Mark L Powley, Campbell, NY (US)

(73) Assignee: Corning Incorporated, Corning, NY (US)

( * ) Notice: Subject to any disclaimer, the term of this patent is extended or adjusted under 35 U.S.C. 154(b) by 628 days.

(21) Appl. No.: 11/801,478

(22) Filed: May 10, 2007

(65) Prior Publication Data

US 2007/0209398 A1 Sep. 13, 2007

(51) Int. Cl.
C03B 23/02 (2006.01)

(52) U.S. Cl. ............... 65/273; 65/63; 65/106

(58) Field of Classification Search ........ 65/90, 65/91, 95, 96, 199, 200, 201, 63, 64, 106, 65/289

See application file for complete search history.

(56) References Cited

U.S. PATENT DOCUMENTS

| | | | |
|---|---|---|---|
| 1,568,618 A | | 1/1926 | Pforr |
| 2,342,891 A | * | 2/1944 | Powers .......................... 65/91 |
| 2,675,646 A | | 4/1954 | Kramer et al. |
| 3,014,234 A | * | 12/1961 | Koppehele ............... 264/290.2 |
| 3,602,754 A | | 8/1971 | Pfaender et al. ......... 313/108 B |
| 3,622,298 A | | 11/1971 | Machlan et al. ................. 65/91 |
| 3,635,687 A | | 1/1972 | Dunlap et al. ................ 65/106 |
| 3,929,444 A | * | 12/1975 | May et al. ................... 65/182.4 |
| 4,218,231 A | * | 8/1980 | Lemmon et al. ............. 65/99.5 |
| 4,486,213 A | | 12/1984 | Lentz et al. ................ 65/30.11 |
| 4,999,039 A | | 3/1991 | Itoi et al. ......................... 65/54 |
| 5,149,349 A | | 9/1992 | Berkley et al. ............... 65/3.11 |
| 6,758,064 B1 | * | 7/2004 | Kariya .......................... 65/91 |
| 6,815,070 B1 | | 11/2004 | Burkle et al. ............ 428/425.6 |
| 2004/0007019 A1 | | 1/2004 | Kohli ......................... 65/17.6 |

FOREIGN PATENT DOCUMENTS

JP 59-4383 1/1984

OTHER PUBLICATIONS

JP03141131A, JP Bibliographic data, "Production Unit For Glass Product", 1989.
JP08183627A, JP Bibliographic data, "Production of Glass Sheet And Apparatus Therefor", 1994.
JP08183628A, JP Bibliographic data, "Apparatus For Producing Glass Sheet", 1994.
JP58095622A, JP Bibliographic data, "Manufacture of Thin Glass Plate", 1981, Japanese Patent document without translation.

* cited by examiner

Primary Examiner—Queenie Dehghan
(74) Attorney, Agent, or Firm—Kevin M. Able

(57) ABSTRACT

The present invention relates to a process for manufacturing flat sheets of a glass-based material and to an apparatus therefor. The process comprises providing a glass preform, heating the glass preform in a furnace, forming a gob and a pre-sheet, removing the gob and drawing the glass pre-sheet into a flat glass sheet. Also provided is an apparatus for drawing a glass preform into a glass sheet, the apparatus comprising a draw furnace, stretching arms for stretching and drawing the pre-sheet into a glass sheet, and opposing edge rollers for applying a downward force on the glass sheet. The draw furnace may include a plurality of individual heating elements, the temperature of each heating element capable of being separately controlled. The apparatus may further include an annealing furnace for annealing the glass sheet.

9 Claims, 4 Drawing Sheets

PROCESS AND DEVICE FOR MANUFACTURING GLASS SHEET

BACKGROUND OF THE INVENTION

1. Field of the Invention

The invention relates generally to a method and an apparatus for forming glass sheet, and more particularly to drawing glass sheet from a glass preform.

2. Technical Background

There is an increasing demand for flat glass sheets, especially precision flat glass sheets, i.e. of high surface quality and consistent thickness, which are made of a glass-based material such as a special glass or a glass-ceramic. Flat panel displays incorporating such flat sheets have received a great deal of attention recently. Much of the attention has centered on small units such as those used in laptop computers. However, consideration is now being given to larger units for information and entertainment applications, where there is a surge of interest in glasses having a high strain point in the display industry. These glasses are needed to make flat display panels for the next-generation liquid crystal displays (LCDs), e.g., active matrix LCDs (AMLCDs), and other advanced displays, e.g., plasma displays. Generally speaking, a strain point of at least 700° C. is desired. Preferably, the strain point is greater than 800° C. In the case of AMLCDs, the need for such a high strain point is dictated by the interest in bonding silicon chips or arrays directly onto glass substrates. Fabrication of poly-silicon on glass substrates is further facilitated by process temperatures of 900° C. or greater. In order to accomplish this objective, it is necessary for the thermal expansion behavior of the glass to be very similar to that of silicon, and for the strain point of the glass to be high enough so that compaction (also known as shrinkage or densification) and/or warping of the glass does not occur after the silicon chips are bonded to the glass and the glass is subsequently heated in further processing steps.

Liquid crystal displays (LCDs) may take the form of two basic matrix types, intrinsic or extrinsic matrix addressed. The intrinsic matrix type relies upon the threshold properties of the liquid crystal material. The extrinsic, or active matrix (AM), type has an array of diodes, metal-insulator-metal (MM) devices, or thin film transistors (TFTs), that supplies an electronic switch to each pixel.

In both cases, two sheets of glass form the structure of the display. The separation between the two sheets is the critical gap dimension, of the order of 5-10 µm. The glass sheets must be transparent, and must withstand the chemical conditions to which they are exposed during display processing. Otherwise, the needs of the two matrix types differ.

Intrinsically addressed LCDs are fabricated using thin film deposition techniques at temperatures ≦350° C., followed by photolithographic patterning. As a result, the substrate requirements therefore are often the same as those for segmented displays. Soda-lime-silica glass with a barrier layer has proven to be adequate for most needs.

A high performance version of intrinsically addressed LCDs, the super twisted nematic (STN) type, has an added requirement of extremely precise flatness for the purpose of holding the gap dimensions uniform. Because of that requirement, soda-lime-silica glass used for those displays must be polished. Alternatively, a precision formed, barium aluminoborosilicate glass, marketed by Corning Incorporated, Corning, N.Y. as Code 1737, may be used without polishing.

Extrinsically addressed LCDs can be further subdivided into two categories; viz., one based on MIM or amorphous silicon (a-Si) devices, and the other based on polycrystalline silicon (poly-Si) devices. The substrate requirements of the MIM or a-Si type are similar to the STN application.

Devices formed from poly-Si, however, are processed at higher temperatures than those that are employed with a-Si TFTs. Substrates capable of use temperatures (taken to be 25° C. below the strain point of the glass) of 600° C.-800° C. are demanded, although the actual temperature required is mandated by the particular process utilized in fabricating the TFTs. Those TFTs with deposited gate dielectrics require temperatures in the range of 600° C.-650° C., while those with thermal oxides call for temperatures of about 800° C.

Both a-Si and poly-Si processes demand precise alignment of successive photolithographic patterns, thereby necessitating that the thermal shrinkage of the substrate be kept low. The higher temperatures required for poly-Si mandate the use of glasses exhibiting higher strain points than soda-lime-silica glass in order to avoid thermal deformation (compaction, i.e. shrinkage) of the sheet during processing. As can be appreciated, the lower the strain point, the greater this dimensional change. Thus, there has been considerable research to develop glasses demonstrating high strain points so that compaction is minimized during device processing at temperatures greater than 600° C.

U.S. Pat. No. 4,824,808 (Dumbaugh, Jr.) lists four properties which have been deemed mandatory for a glass to exhibit in order to fully satisfy the needs of a substrate for LCDs:

First, the glass must be essentially free of intentionally added alkali metal oxide to avoid the possibility that alkali metal from the substrate can migrate into the transistor matrix;

Second, the glass substrate must be sufficiently chemically durable to withstand the reagents used in the TFT matrix deposition process;

Third, the expansion mismatch between the glass and the silicon present in the TFT array must be maintained at a relatively low level even as processing temperatures for the substrates increase; and Fourth, the glass must be capable of being produced in high quality thin sheet form at low cost; that is, it must not require extensive grinding and polishing to secure the necessary surface finish.

That last requirement is most difficult to achieve inasmuch as it demands a sheet glass production process capable of producing essentially finished glass sheet.

The two methods commonly used in manufacturing LCD substrates are the float process and the fusion process. Both of these processes require a refractory glass melter to deliver a stream of glass to a sheet-forming device. In the case of high strain-point glass compositions, a relatively large high-temperature glass melter is needed to deliver a high-quality stream of glass to the sheet-forming device. This is because high strain-point glasses have high fusion temperatures, typically in excess of 1700° C.

In the float process, a stream of molten glass is discharged from a melting furnace into a float furnace that contains a liquid metal medium. Typically, the metal is tin. The atmosphere in the float furnace is controlled to prevent oxidation of the tin. The molten glass floats and spreads out on the liquid tin in the form of a flat, continuous ribbon. The ribbon of glass is conveyed into an annealing lehr or cooling tunnel, where it is cooled at a controlled rate to ambient temperature. The cooled glass has a flat, smooth surface that requires a minimum of further finishing by processes such as grinding and polishing.

However, it is very difficult to form glasses having high strain points in an enclosure containing molten tin. This is because tin has high vapor pressures at temperatures in excess of 1050 to 1100° C. At the high forming temperatures required for high strain-point glasses, the molten tin will vaporize inside the float furnace and subsequently condense in colder parts of the furnace. In some cases, the condensation may be sufficiently high to create what is referred to as "tin rain," a situation where tin rains on the glass and is incorporated on the glass surface.

In the fusion process, a glass-forming melt flows into a refractory trough and then overflows in a controlled manner from either side of the trough. A key advantage of this process is that the surface of the glass sheet which is ultimately formed does not come in contact with any refractory material or other forming equipment. Another benefit of the process is that it yields a very flat and uniformly thick sheet of glass. As a result, no secondary processing is needed to obtain a smooth, flat, and uniform sheet of glass for display applications. However, the method suffers from not being able to process glasses having high strain points due to the high temperatures required, since such temperatures greatly accelerate deterioration of the glass forming components, and the potential for increased contamination of the glass melt. Typically, it is desirable to form the glass at viscosities in the range of $10^5$ to $10^6$ poise to obtain optimum flatness and uniform thickness.

A brief description of both the fusion draw and float processes are given in a manuscript entitled "Glass" by D. C. Boyd and D. A. Thompson, Encyclopedia of Chemical Technology, Vol. 11, Third Edition, pp. 807-880 (see pages 860-863). The fusion draw process is also described in U.S. Pat. Nos. 3,338,696 and 3,682,609, both issued to Dockerty. Unfortunately, neither the fusion draw process nor the float glass process is effective in producing flat sheet from a glass composition having a high strain point, one whose strain point may, for example, exceed 900° C.

SUMMARY

In one broad aspect, the invention includes providing a glass preform, heating the glass preform in a furnace to form a gob and a pre-sheet, detaching the gob from the pre-sheet, stretching the pre-sheet to a predetermined width and drawing the pre-sheet into a glass sheet having a predetermined thickness. The glass preform preferably has a strain point greater than about 700° C., and more preferably greater than about 900° C.

In one embodiment of the invention, stretching of the pre-sheet is initiated by stretching arms which move inward toward the pre-sheet to contact the pre-sheet, then move outward to stretch the pre-sheet into a glass sheet. The stretching arms may also be used to draw the glass sheet downward to engage with edge rollers.

Edge rollers which have engaged with the glass sheet apply a downward pulling force on the glass sheet, thereby attenuating the thickness of the glass sheet. Glass sheet less than 4 mm, advantageously less than 1 mm, and even less than 100 µm may be drawn in accordance with the invention. The glass sheet may be cut into individual panes of glass during the draw process, or thereafter, or may be rolled for storage if the glass sheet is sufficiently thin enough to provide the requisite flexibility.

In accordance with the invention, glasses having a strain point greater than about 600° C. may be drawn, preferably greater that about 700° C. Glasses having a strain point greater than about 900° C. may advantageously be drawn into glass sheet.

The method of the invention may also include the application of a protective coating to the glass sheet. The protective coating may be applied as either a liquid or as a solid film. If applied as a liquid, the method further includes curing of the coaint by appropriate means, such as by thermal curing or photo curing.

In another broad aspect, the invention provides for an apparatus for drawing glass sheet which includes a draw furnace, stretching arms movably mounted below the furnace for contacting, stretching and drawing a pre-sheet into a glass sheet and edge rollers rotatably mounted below the stretching arms for engaging with the glass sheet and applying a downward force to the glass sheet.

In a preferred embodiment, the draw furnace comprises a plurality of heating elements, the temperature of which may be individually controlled. Such an arrangement provides an ability to adjust a temperature profile within the draw furnace in a vertical and/or horizontal direction, to minimize warping of the glass sheet.

The inventive apparatus may comprise an annealing furnace arranged below (downstream) of the draw furnace. The annealing furnace may be attached to the draw furnace, or it may be connected to the draw furnace.

The apparatus according to the present invention may also include a system for coating the drawn glass sheet, such as, for example, a liquid bath coating system, or a system for the application of a plastic film. In the case of a liquid bath configuration, the glass sheet is drawn through a suitable coating die which applies a liquid coating having a substantially uniform thickness across at least the road side or sides of the glass sheet. The coating may encompass the edges of the glass sheet. A polymer coating may be applied through the use of one or more rollers, and may be applied to either or both sides of the glass sheet.

The invention will be understood more easily and other objects, characteristics, details and advantages thereof will become more clearly apparent in the course of the following explanatory description, which is given, without in any way implying a limitation, with reference to the attached Figures.

DETAILED DESCRIPTION

Figure 1:
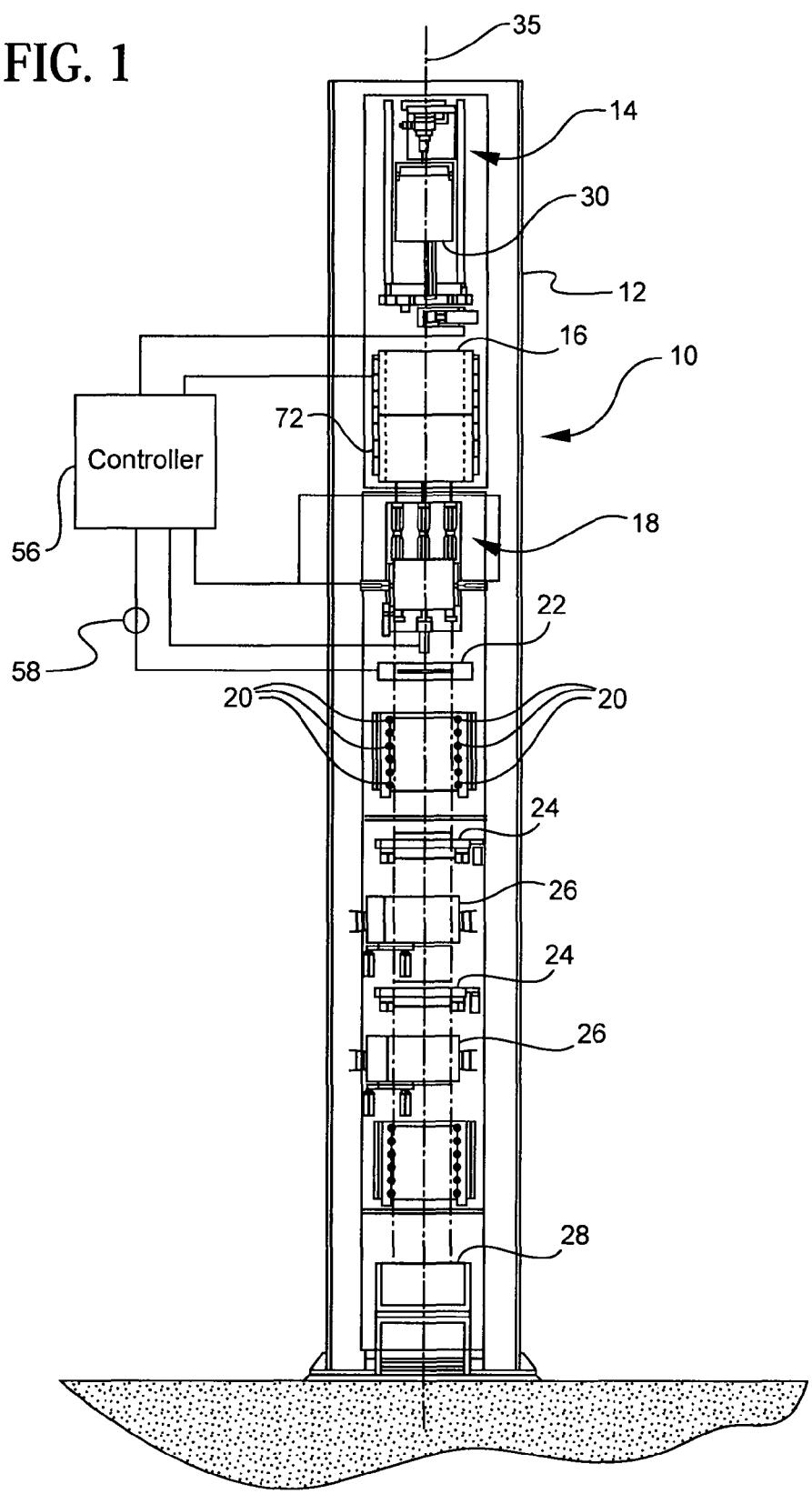
FIG. 1 is a view of a draw tower comprising individual components which may be used to draw glass sheet from a preform.

As seen in FIG. 1, the present invention comprises, inter alia, providing a glass preform, heating the glass preform in a furnace, forming a gob and drawing the preform into a glass sheet. By forming a gob what is meant is heating a glass preform to at least its softening point, whereupon a portion of the preform (the gob) pulls away from the body of the preform, drawing with it a broad flow of glass (the pre-sheet). The softening point is generally regarded as the temperature at which glass will deform under its own weight, a viscosity of approximately $10^{7.6}$ poise.

In one embodiment of the invention, a glass preform is formed by conventional glass forming techniques. Such techniques include chemical vapor deposition and casting methods, including the use of sol gels. Chemical vapor deposition (CVD) techniques are well known in the optical fiber arts, and include outside vapor deposition (OVD), vapor phase deposition (VAD), and modified chemical vapor deposition (MCVD), to name a few. Both OVD and VAD entail hydrolyzing glass precursor chemicals in a flame to form a soot, and depositing the soot onto a target to form a porous glass soot preform. The porous soot preform may then be cleaned, dehydrated and consolidated by first heating the preform in the presence of a cleansing gas, such as a chlorine-containing gas, after which the preform is further heated to a temperature sufficient to cause the soot particles to consolidate into a clear, solid glass preform. However, it should be noted that the available glass deposition methods are not limited to the examples as presented above.

In contrast to OVD or VAD, casting of a glass preform may include the mixing of organic glass precursors to form a greenware preform. The greenware preform is dried by heating and/or exposure to a suitable cleansing gas such as a chlorine-containing gas, then heated to consolidate the greenware preform into a clear, solid glass preform. Alternative methods of casting a glass preform include melting glass (e.g. cullet or glass soot) in a suitable crucible and thereafter pouring the molten glass into an appropriate mold to form the desired preform shape. Both casting methods are well known in the art, and will not be described further. As with the methods of depositing glass described previously, it should be noted that casting methods are not limited to the examples as presented herein.

FIG. 1 shows an apparatus, generally designated by reference numeral 10, for drawing glass sheet from a preform in accordance with an embodiment of the present invention. The apparatus shown comprises a draw tower 12 for mounting various glass sheet drawing components. The draw tower is well-secured to a solid foundation to prevent vibrations from sources external to the draw tower from disrupting the geometry of the glass sheet which is being drawn. The draw tower may be similar to such towers used for the manufacture of optical fiber. Such draw towers may be mounted on concrete footings sunk several tens of feet below the earth to prevent vibration. The apparatus according to the present embodiment further comprises a preform supporting assembly 14 for holding and supporting the glass preform, a draw furnace 16, a stretching arm assembly 18, and edge rollers 20.

Apparatus 10 may optionally include glass thickness measuring device 22, one or more coating applicators 24, one or more coating curing devices 26, and a take-up spool 28.

In accordance with the invention, a solid, a clear glass preform 30 is provided by any of the techniques described above, or by any of the other known glass making techniques. Preferably, preform 30 is rectangular in shape, having generally parallel opposing sides and a width which is greater than the thickness. For performs which may be formed in other shapes, such as cylindrical, the preform may be shaped, such as by grinding, into a generally rectangular shape. Although the present invention is capable of drawing glass sheet from preforms having a strain point similar to conventional glasses used in float or fusion processes, e.g. between about 600° C. and 700° C., glass having much higher strain points, such as strain points greater than about 700° C., 800° C. or even greater than about 900° C., may be drawn. For example, pure fused silica having a strain point of about 1956° C. may advantageously be drawn into a glass sheet using the apparatus and method of the present invention.

Figure 2:
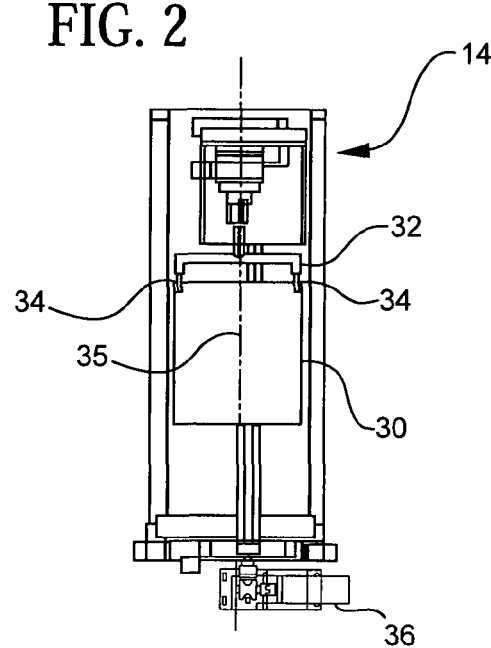
FIG. 2 is a close-up view of a preform supporting assembly, shown holding a glass preform, according to an embodiment of the invention.

To provide a method of handling the glass preform, the glass preform is typically suspended from preform supporting assembly 14, shown in greater detail in FIG. 2, which comprises clamping bar 32 for clamping onto and securely holding preform 30. Clamping bar 32 may be attached to the upper edge of preform 30 by one or more clamps 34 attached to the clamping bar. However, other means of supporting the glass preform, such as by integral handles fused onto the preform, are within the scope of the present invention. Preform supporting assembly 14 is capable of moving the preform in parallel vertical directions, either upward or downward (along z axis 35), via motor 36. It is also desirable that preform supporting assembly 14 be capable of moving the preform in a direction orthangonal to the z axis (i.e. in the x-y plane) so that the preform may be positioned appropriately within furnace 16. For example, it is typically desirable to center the preform with the furnace to ensure even heating of the preform.

Once suspended, preform 30 is lowered into a hot zone of draw furnace 16 by preform supporting assembly 14, whereupon a portion of preform 30 is heated to at least its softening point. Draw furnace 16 may be a resistance furnace, wherein heat is derived by flowing a current through resistance heating elements; an induction furnace, wherein heat is derived by inducing a current flow in a microwave susceptor, or any other method capable of heating the furnace to a temperature of at least the softening point of the glass preform. For example, the furnace could be a gas furnace wherein a gas fuel is burned to form a flame. Preferably, the furnace is capable of heating the glass to a temperature of at least about 900° C.; more preferably at least about 1500° C.; and most preferably to at least about 2200° C.

Figure 3:
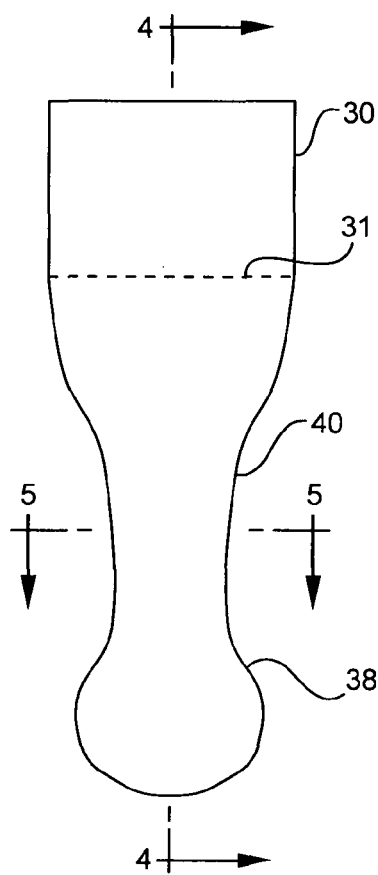
FIG. 3 is an illustration of the glass preform, trailing glass (pre-sheet) and gob
Figure 4:
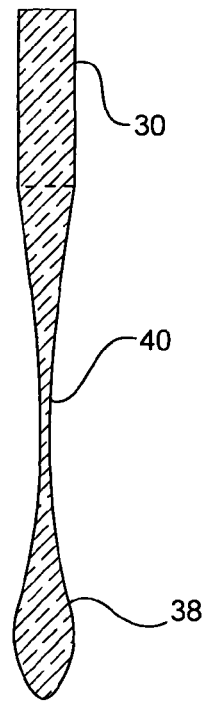
FIG. 4 is an edge view cross sectional illustration of a preform, trailing glass (pre-sheet) and glob.
Figure 5:
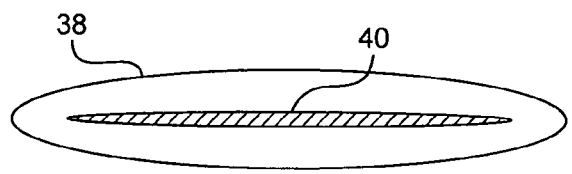
FIG. 5 is an axial cross section of the pre-sheet connecting the gob to the glass preform.

As illustrated by FIG. 3, when a portion of preform 30, typically the bottom edge portion of the preform indicated generally by phantom line 31, has been heated to at least the softening point of the glass, gob 38 will form and pull away from the preform as a result of gravitational force, drawing with it trailing glass 40 which connects the glob to the preform. A longitudinal cross section of preform 30, gob 38 and trailing glass 40 is illustrated in FIG. The formation and pulling away of the gob from perform 30 is generally referred to as "dropping a gob." By way of comparison, the trailing glass in an optical fiber forming process is a generally circular cross-section filament. For a sheet drawing process such as the one disclosed herein, the starting preform is generally rectangular in shape rather than cylindrical, as would be the case for an optical fiber preform. According to the present invention, trailing glass 40, hereinafter referred to as pre-sheet 40, is broad and non-circular. An axial cross section of pre-sheet 40 is shown in FIG. 5. Pre-sheet 40 may have a convex cross section, as shown in FIG. 5, being generally elliptical, or pre-sheet 40 may have a concave cross section, or a combination of both convex and concave. Preferably, pre-sheet 40 has a generally rectangular cross section. The pre-sheet therefore is a broad, thick (relative to the final glass sheet thickness) glass flow connecting the gob to the main body (preform) of glass and before any horizontal stretching process is performed. Pre-sheet 40 generally attenuates in width very rapidly in a direction from the base (root) of the preform toward gob 38 and is therefore typically unacceptable as a final glass sheet. Moreover, the pre-sheet may also be unacceptably thick and have an uncontrolled and varying thickness across the width of the pre-sheet.

Figure 6:
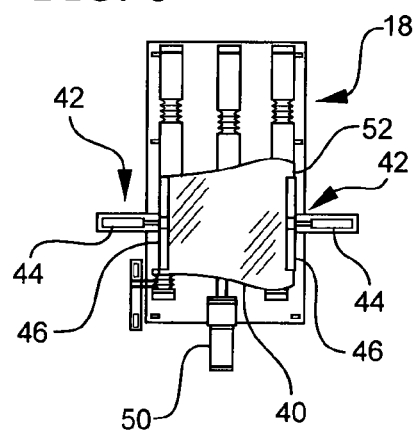
FIG. 6 is a close up view of the stretching arms assembly in accordance with the present invention.

When gob 38 and attached pre-sheet 40 have fallen a sufficient distance from the exit of draw furnace 16 to provide access to the gob, gob 38 may be removed, such as by scoring the pre-sheet across the width of the glass flow, and snapping gob 38 from the pre-sheet. Stretching arms 42, shown in FIG. 6, are moved inward toward pre-sheet 40 and contact the pre-sheet along a length of each edge of the pre-sheet. Stretching arms 42 may be moved inward by any suitable method. For example, stretching arms 42 may be pneumatically or hydraulically operated. Stretching arms 42 may be operated by a motor, such as by attaching one end of a screw to the stretching arms, the screw being attached at the opposite end thereof to a motor and riding within a stationary nut. The stretching arms are moved inward to a point where the stretching arms contact the pre-sheet, whereupon the pre-sheet adheres to each stretching arm. The stretching arms are then moved outward, preferably synchronously and symmetrically (at the same rate), stretching the pre-sheet to form a sheet of glass having a predetermined width. Stretching arms 42 are then moved downward, drawing the glass sheet downward until the glass sheet engages with edge rollers 20.

Each stretching arm of this embodiment comprises a pneumatic or hydraulic actuator 44 and a contact bar 46 which is connected to the actuator. Actuator 44 operates to contact pre-sheet 40 with contact bar 46 by moving the contact bar inward toward the pre-sheet. The stretching arms are shown mounted on carriage assembly 48 which is capable of moving the stretching arms up and down, by way of motor 50, along a length of the flow of glass exiting the draw furnace.

Once pre-sheet 40, which has been widened into a glass sheet 52 by the stretching arms, the glass sheet 52 engages with edge rollers 20, and the stretching arms are detached from the edges of the sheet. The stretching arms may be detached from the edges of the glass sheet, for example, by rotating the stretching arms out of the plane of the glass sheet, thereby applying sufficient torque to the bond between the contact bar portion of the stretching arms and the glass to break the bond and release contact bar 46. Preferably, each contact bar is comprised of a material which will adhere to the glass, but may also be readily detached from the glass. The contact bars are preferably comprised of platinum.

Figure 7:
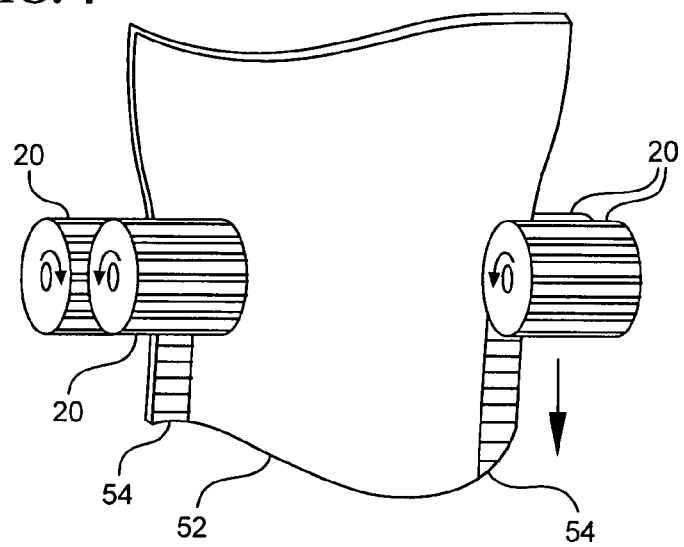
FIG. 7 is a perspective view of a set of edge rollers, showing two opposing pairs of edge rollers which impart a downward pulling force on the glass sheet.

As illustrated in FIG. 7, edge rollers 20 are arranged in sets of at least two pairs of opposing rollers, each pair of opposing edge rollers positioned at opposing sides of the glass sheet, and driven by motors (not shown). A set of edge rollers then comprises at least four rollers, two opposing rollers on each side of the glass sheet. Edge rollers 20 engage glass sheet 52 along a portion 54 of each side of glass sheet 52 and apply a downward force to the glass sheet, thereby drawing the glass sheet from the heated preform. Edge rollers 20 also cool the edges of the glass sheet, therefore stiffening the glass sheet edges. Edge rollers 20 may be cooled, for example by forcing a cooling medium through one or more passages (not shown) within the interior of each roller. The cooling medium could be, for example, air or water. To improve their grip upon the glass sheet, edge rollers 20 may be toothed or ridged, as illustrated in FIG. 7, or have other surface features capable of facilitating the application of increased torque upon the glass sheet.

The present invention is advantageous, particularly in the case of CVD-formed preforms, in that the outside surface of the glass need not touch another surface from the point of formation of the preform by, for example, deposition of glass soot, to dropping of the gob. That is, the surface of the glass which will become the glass sheet remains largely untouched. Therefore, both broad surfaces (faces) of the drawn glass sheet are pristine. That portion 54 of the glass sheet along the edges of the sheet which has been contacted by the stretching arms and/or edge rollers, referred to as the "bead", is later removed from the glass sheet.

As glass sheet 52 is drawn downward, the thickness of the glass sheet attenuates until the glass sheet reaches a predetermined thickness. The thickness of the glass sheet is a factor of, inter alia, the speed at which the sheet is drawn from the preform (i.e. the linear speed of the edge rollers at the point of contact between the edge rollers and the glass sheet), the speed at which the preform is fed into the draw furnace (downfeed rate), and the temperature of the draw furnace. It is not necessary that the glass sheet be fully formed, e.g. have reached a predetermined thickness, at the point of contact between the glass sheet and a first set of edge rollers. It is within the scope of the current invention that the glass sheet have a viscosity after contact with a first set of edge rollers such that the sheet thickness may be further reduced after contact with the first set of edge rollers. This is particularly true when very thin sheets of glass are desired, such as glass sheets having a thickness less than about 1 mm. Thus, additional sets of edge rollers may be employed along the path of the glass sheet as is needed to attenuate the thickness of the glass sheet to the desired thickness. Although the upper limit for the thickness of the glass sheet which may be drawn in accordance with the present invention is generally determined by the thickness of the preform, preferably, the thickness of the glass sheet drawn in accordance with the present invention is less than about 4 mm, more preferably less than about 1 mm, and most preferably less than about 0.7 mm. Glass sheet drawn in accordance with the present invention may even be drawn to a thickness less than about 100 μm.

The thickness of the glass sheet may optionally be measured as part of the drawing process, and the results of such a measurement used to control, for example, the downfeed rate of the preform, or the rotational speed of the edge rollers. The glass sheet thickness may be measured by a suitable measuring device, such as a laser micrometer, indicated by reference numeral 22 in FIG. 1. Such devices are commercially readily available. An error signal is developed by measuring device 22 based on a pre-determined setpoint for glass sheet thickness which has been input into a controller. The error signal is relayed to controller 56 through control line 58. Controller 56 may be, for example, a computer. Controller 56 may then adjust downfeed rate, edge roller rotational speed and/or torque, or furnace temperature, or a combination thereof according to pre-determined instructions (such as a computer program), to reduce the error signal from measuring device 22 and therefore correct the glass sheet thickness.

The manner of recovering the drawn glass sheet depends in part upon the thickness of the glass sheet. For example, if the glass sheet has a thickness on the order of several tens of microns, the glass sheet may advantageously be rolled onto bulk spool 28, shown in FIG. 1, from which individual panels of predetermined size may be cut at a later time. Alternatively, the direction of the flow of glass may be altered such that the glass may extend a distance longer than the vertical distance between the draw furnace and the bottom of the support structure (e.g. the floor), such as, for example, by changing the direction of the glass flow from vertical to horizontal at the vertical base of the glass flow and conveying the glass flow in the horizontal direction, such as over rollers, until individual panels of glass sheet may be cut from the flow.

On the other hand, glass sheet having a thickness such that the glass sheet would break during an attempt to roll the sheet, for example greater than about a millimeter in thickness, must be cut into individual panels of a predetermined size or sizes during the drawing process. Cutting of the glass sheet into individual panels may be accomplished by any conventional method known in the art, including scoring and breaking, or laser cutting of the glass sheet.

To provide protection to the surface of the glass sheet, the glass sheet may be coated during the drawing process, such as by applying an acrylate coating. Such a coating may be applied, for example, by drawing the glass sheet through a liquid coating bath contained within coating die 24. Die 24 may be pressurized. Alternatively, a liquid coating may be sprayed onto the surface of the glass. The liquid coating may be applied to one or more surfaces of the glass. The liquid coating may thereafter be cured by curing apparatus 26 as is required for the coating type. For example, curing apparatus 26 may be an oven for coating which is cured by heating (thermal cure), or curing apparatus 26 may cure the coating by exposing the coating to ultraviolet light (photocure).

Figure 8:
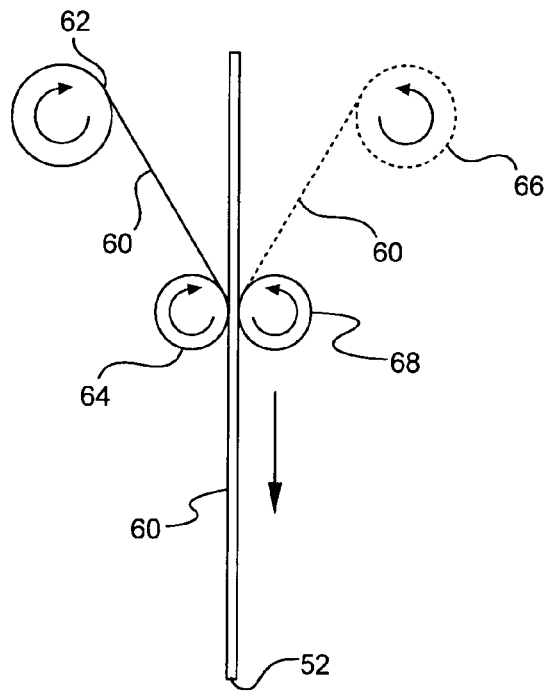
FIG. 8 is a side view showing the application of a solid plastic film to a glass sheet as it is being drawn.

As a further alternative, a protective coating may be provided by applying a solid protective layer to the broad surfaces of the glass sheet, such as by pressing a plastic film to the glass sheet as it is drawn as depicted in FIG. 8. FIG. 8 shows an edge view of glass sheet 52 being drawn in accordance with the present invention. For example, a suitable plastic film 60 may be fed from bulk roll 62 and pressed against the glass sheet by a first application roller 64, as depicted in FIG. 8. FIG. 8 shows a plastic film being applied to one side of the glass sheet. However, plastic film 60 may easily be applied to both sides of the glass sheet as indicated by second bulk roll 66 and second application roller 68. In the case of applying only a single solid plastic film to glass sheet 52, it may nevertheless be desirable to include second application roller 68, without the addition of a second plastic film, to serve as a backing force to prevent movement of glass sheet 52 by first application roller 64.

Figure 9:
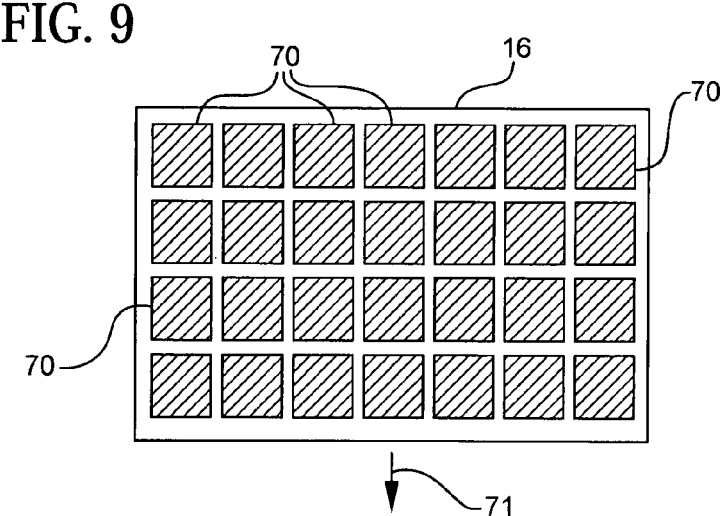
FIG. 9 is a front view of a draw furnace according to an embodiment of the present invention showing individual and separately controllable heating elements.
Figure 10:
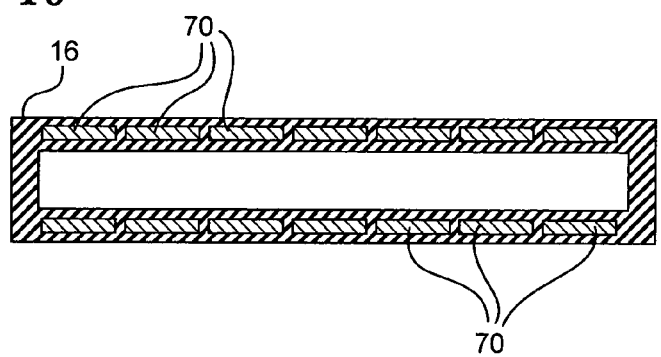
FIG. 10 is a horizontal cross sectional view of a draw furnace according to an embodiment

In a preferred embodiment, draw furnace 16 may comprise a plurality of individual heating elements 70 as shown in FIG. 9. A large number of heating elements are illustrated in FIG. 9, however a smaller number of rows and or columns of heating elements may be used, as appropriate. FIG. 9 is a view of the draw furnace from a front (or side) of the furnace. FIG. 10 depicts a horizontal cross section of the furnace in accordance with the embodiment, viewed from the top of the furnace, wherein the furnace is shown to have a rectangular, hollow cross section. Other cross sectional shapes may be employed as required, however a rectangular configuration is preferred. Heating elements 70 are shown. Individual heating elements 70 may be arranged linearly across the width of the furnace, i.e. in a single row or column, or the individual heating elements may be arranged in a grid or matrix fashion having multiple rows and/or columns of individual elements. Preferably, the individual heating elements are separately controlled, for example by controller 56 such that their temperature may be separately adjusted. The use of individual heating elements, the temperature of which are separately controllable, provides greater flexibility to the drawing process by facilitating the application of a specific spatial temperature profile to the glass sheet, thereby reducing temperature related defects such as warping of the glass sheet due to an uneven temperature profile across the width of the sheet. The glass is being drawn in a direction indicated by arrow 71.

In the instance where multiple and separately controlled heating elements are employed, controller 56 may also control the temperature of the individual heating elements to adjust a temperature profile which is applied to the glass preform.

Vertical variation of the furnace temperature may also facilitate a degree of controlled cooling of the glass sheet, thereby allowing for limited annealing of the glass sheet during the draw process in order to relieve stresses in the sheet. In addition, optional annealing furnace 72 may be provided for the purpose of further annealing the glass sheet. Annealing furnace 27 may be connected to draw furnace 16, as shown in FIG. 1, or annealing furnace 72 may be separate from draw furnace 16.

EXAMPLE 1

A preform comprised of a glass having a strain point of 665° C. was drawn in accordance with the invention disclosed herein. The glass preform had a rectangular cross section of 59 mm wide by 3 mm thick. The preform was lowered through a hot zone of a resistance heated draw furnace at a rate (downfeed rate) of 15 mm/min, where the bottom edge of the preform was heated to a temperature of 1225° C. A gob was formed and dropped, then separated from the pre-sheet by scoring and breaking. A single set of edge rollers, one pair of opposing edge rollers on each side of the glass sheet, was employed to draw a glass sheet, after initial stretching of the pre-sheet by platinum stretching arms. The edge rollers drew the glass sheet at a rate of 150 mm/min. The drawn glass sheet had a final thickness of 1 mm and a width of 25 mm. The final glass sheet was annealed for 4 hours at a temperature of 600° C. After annealing, the glass sheet exhibited a compaction of 53 ppm.

EXAMPLE 2

A preform comprised of a glass having a strain point of 800° C. was drawn in accordance with the invention disclosed herein. The glass preform had a rectangular cross section of 59 mm wide by 3 mm thick. The preform was lowered through a hot zone of a resistance heated furnace at a rate (downfeed rate) of 15 mm/min, where the bottom edge of the preform was heated to a temperature of 1300° C. A gob was formed and dropped, then separated from the pre-sheet by scoring and breaking. A single set of edge rollers, one pair of opposing edge rollers on each side of the glass sheet, was employed to draw a glass sheet, after the initial stretching of the pre-sheet by platinum stretching arms. The edge rollers drew the glass sheet at a rate of 150 mm/min. The drawn glass sheet had a final thickness of 1 mm and a width of 25 mm. The final glass sheet was annealed for 4 hours at a temperature of 600° C. After annealing, the glass sheet exhibited a compaction of 3 ppm.

It will be apparent to those skilled in the art that various other modifications and variations can be made to the present invention without departing from the spirit and scope of the invention. Thus it is intended that the present invention cover the modifications and variations of this invention provided they come within the scope of the appended claims and their equivalents.

What is claimed is:

1. An apparatus for drawing glass sheet from a glass preform comprising:
 a draw tower comprising:
  a support assembly configured to support the glass preform, the support assembly further configured to move the glass preform along a vertical axis;

a draw furnace disposed below the support assembly that heats the glass preform supplied by the support assembly to form a viscous glass pre-sheet that flows in a vertical direction from the draw furnace;

stretching arms mounted to actuators below the draw furnace, the actuators configured to move the stretching arms in a direction perpendicular to the pre-sheet flow direction;

contact bars operably connected to the stretching arms that adhere to edges of the glass pre-sheet;

a carriage assembly that moves the stretching arms vertically along the flow direction of the pre-sheet; and opposing edge rollers rotatably mounted below the stretching arms for engaging the glass sheet and applying a downward force to the glass sheet, thereby reducing a thickness of the glass sheet.

2. The apparatus according to claim 1 wherein the draw furnace comprises a plurality of individual heating elements.

3. The apparatus according to claim 1 wherein a temperature of the individual heating elements may be separately controlled.

4. The apparatus according to claim 1 further comprising an annealing furnace positioned downstream of the draw furnace.

5. The apparatus according to claim 1 further comprising means positioned downstream of the draw furnace relative to a direction of flow of the glass sheet for applying a protective coating to the glass sheet.

6. The apparatus according to claim 1 wherein the actuators are hydraulic or pneumatic.

7. The apparatus according to claim 1 wherein the edge rollers are cooled.

8. The apparatus according to claim 2 wherein the heating elements are arranged in a plurality of rows and columns.

9. The apparatus according to claim 1 further comprising a bulk spool on which the glass sheet is wound.

* * * * *

UNITED STATES PATENT AND TRADEMARK OFFICE
CERTIFICATE OF CORRECTION

PATENT NO. : 7,770,414 B2
APPLICATION NO. : 11/801478
DATED : August 10, 2010
INVENTOR(S) : Patrick Joseph Cimo et al.

It is certified that error appears in the above-identified patent and that said Letters Patent is hereby corrected as shown below:

| Col. | Line | Description |
|---|---|---|
| 1 | 43 | Please delete "(MM)" and add --(MIM)-- |
| 4 | 4 | Please delete "coaint" and add --coating-- |

Signed and Sealed this

Nineteenth Day of October, 2010

David J. Kappos
*Director of the United States Patent and Trademark Office*